(12) United States Patent
Francisco et al.

(10) Patent No.: US 8,066,096 B1
(45) Date of Patent: Nov. 29, 2011

(54) INLET SILENCER

(75) Inventors: Jay M. Francisco, Chula Vista, CA (US); Jack V. Vitale, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/939,649

(22) Filed: Nov. 4, 2010

(51) Int. Cl.
*B64D 33/02* (2006.01)
*F01N 1/10* (2006.01)
*B64D 33/00* (2006.01)
*F01N 1/08* (2006.01)
*F01N 1/00* (2006.01)

(52) U.S. Cl. ............................... 181/214; 181/252

(58) Field of Classification Search .......... 181/214, 181/222, 224, 225, 226, 229, 252, 249, 256, 181/257, 251, 270, 275, 262; 123/184.57
See application file for complete search history.

(56) References Cited

U.S. PATENT DOCUMENTS

| | | | | |
|---|---|---|---|---|
| 1,916,908 A | * | 7/1933 | Lewis et al. | 181/224 |
| 2,998,860 A | * | 9/1961 | Everett | 181/257 |
| 3,602,333 A | * | 8/1971 | Kobayashi et al. | 181/252 |
| 3,949,830 A | * | 4/1976 | Muehlbauer et al. | 181/224 |
| 4,091,892 A | * | 5/1978 | Hehmann et al. | 181/286 |
| 4,108,276 A | * | 8/1978 | Hall et al. | 181/256 |
| 4,236,597 A | * | 12/1980 | Kiss et al. | 181/224 |
| 4,253,542 A | * | 3/1981 | Ruspa et al. | 181/272 |
| 4,615,411 A | * | 10/1986 | Breitscheidel et al. | 181/224 |
| 4,628,689 A | * | 12/1986 | Jourdan | 60/295 |
| 4,905,789 A | * | 3/1990 | Francis | 181/224 |
| 4,924,966 A | * | 5/1990 | Kanda et al. | 181/228 |
| 5,164,550 A | * | 11/1992 | Beidl et al. | 181/229 |
| 5,661,973 A | * | 9/1997 | Casey | 60/279 |
| 6,321,870 B1 | * | 11/2001 | Waronitza et al. | 181/229 |
| 6,405,825 B1 | * | 6/2002 | Yabe et al. | 181/204 |
| 7,141,101 B2 | * | 11/2006 | Amann | 96/380 |
| 7,730,997 B2 | * | 6/2010 | Asada et al. | 181/270 |
| 7,806,229 B2 | * | 10/2010 | Dyck et al. | 181/225 |
| 7,832,524 B2 | * | 11/2010 | Mueller et al. | 181/229 |
| 7,878,298 B2 | * | 2/2011 | Winter et al. | 181/227 |
| 2006/0272888 A1 | * | 12/2006 | Lucas et al. | 181/252 |
| 2010/0089356 A1 | * | 4/2010 | Plaxton | 123/184.57 |

FOREIGN PATENT DOCUMENTS

| | | | | |
|---|---|---|---|---|
| DE | 3608804 A1 | * | 9/1987 | |
| JP | 56014820 A | * | 2/1981 | |
| JP | 57013223 A | * | 1/1982 | |
| JP | 05346791 A | * | 12/1993 | |

* cited by examiner

*Primary Examiner* — Edgardo San Martin
(74) *Attorney, Agent, or Firm* — Stephen G. Mican

(57) ABSTRACT

An inlet silencer for an air inlet in a housing, which housing contains a source of high frequency noise radiated by an air intake for the source of high frequency noise, comprises: a plenum that extends longitudinally within the housing that couples the air inlet in an upstream region of the plenum to the air intake for the source of high frequency noise in a downstream region of the plenum; a partition that extends laterally within the plenum between the upstream region of the plenum and the downstream region of the plenum; at least one channel that penetrates longitudinally through the partition that has a gap across its inner surface that approximates one wavelength of at least one fundamental frequency of high frequency noise that the source of high frequency noise generates; and acoustic damping material that lines the inner surface of the channel.

23 Claims, 4 Drawing Sheets

INLET SILENCER

DESCRIPTION OF THE EMBODIMENTS

Figure 1:
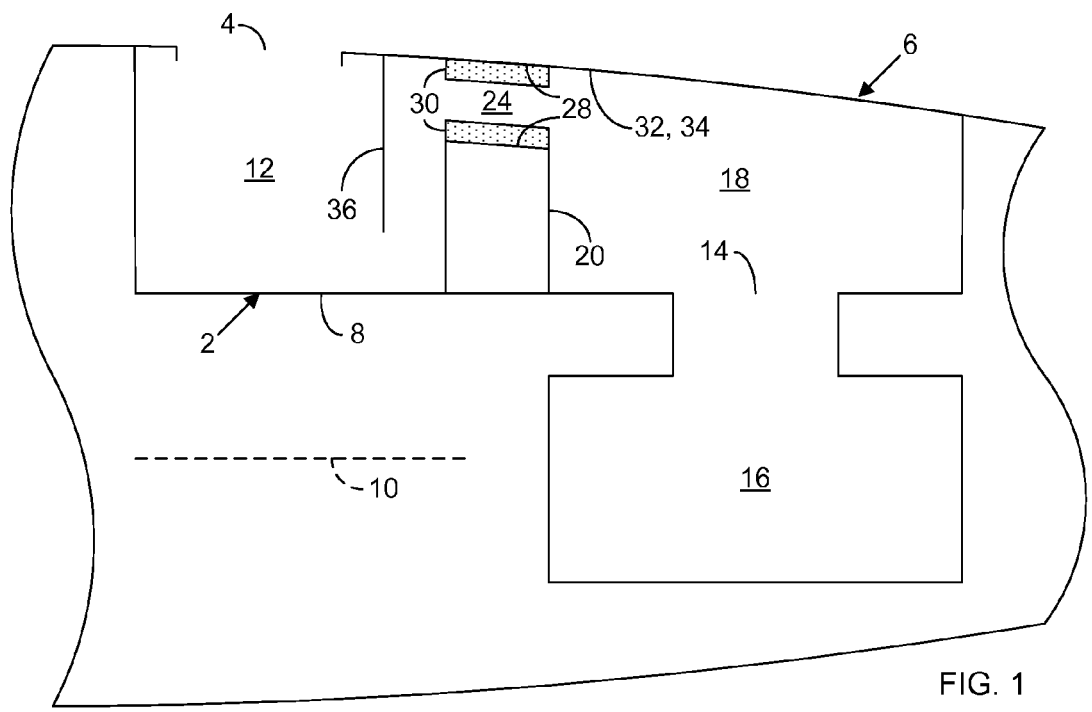
FIG. 1 is a cut-way side view of an inlet silencer for an air inlet in a fuselage of an aeronautical vehicle according to a first possible embodiment.
Figure 2:
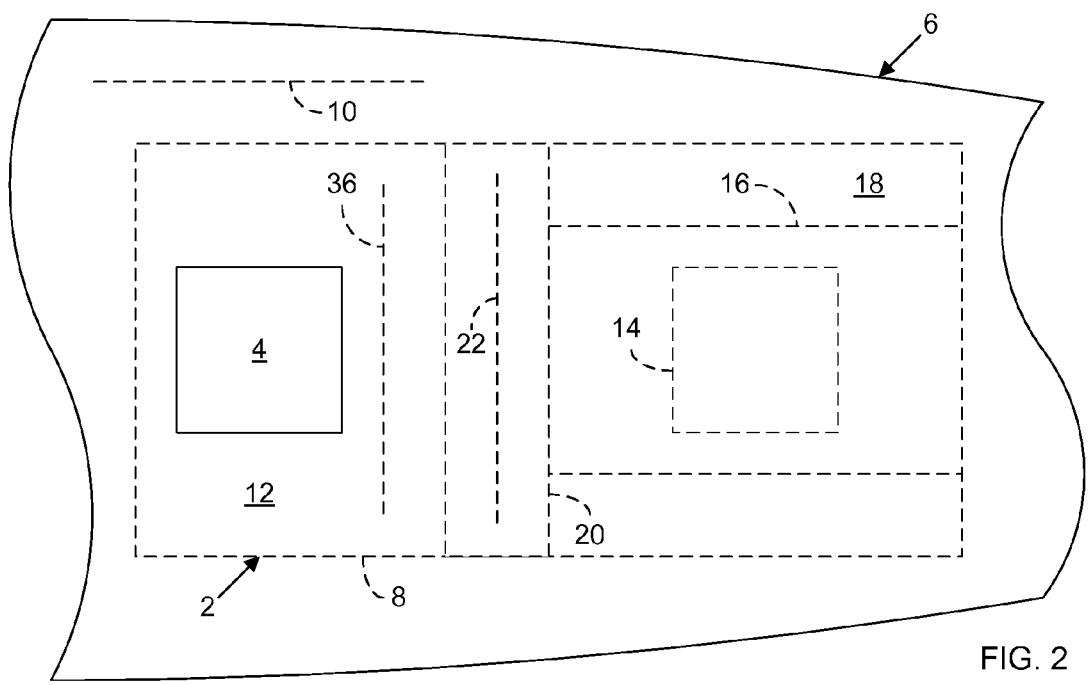
FIG. 2 is a top view of the inlet silencer mounted in the fuselage shown in FIG. 1.

FIGS. 1 and 2 are respective cut-away side and top views of an inlet silencer 2 for an air inlet 4 in a housing such as a fuselage 6 of an aeronautical vehicle according to a first possible embodiment. The inlet silencer 2 comprises a plenum 8 that extends along a longitudinal axis 10 within the fuselage 6 that couples the air inlet 4 in an upstream region 12 of the plenum 8 to an air intake 14 for a source of high frequency noise such as a gas turbine engine 16 in a downstream region 18 of the plenum 8.

Figure 3:
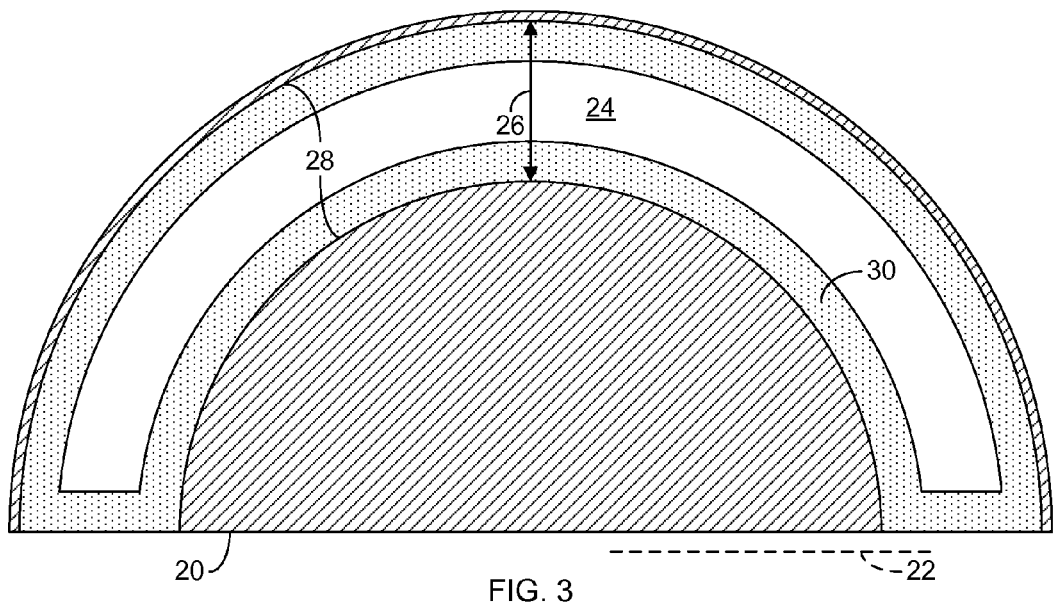
FIG. 3 is an end view of a partition and channel for the inlet silencer shown in FIGS. 1 and 2.
Figure 4:
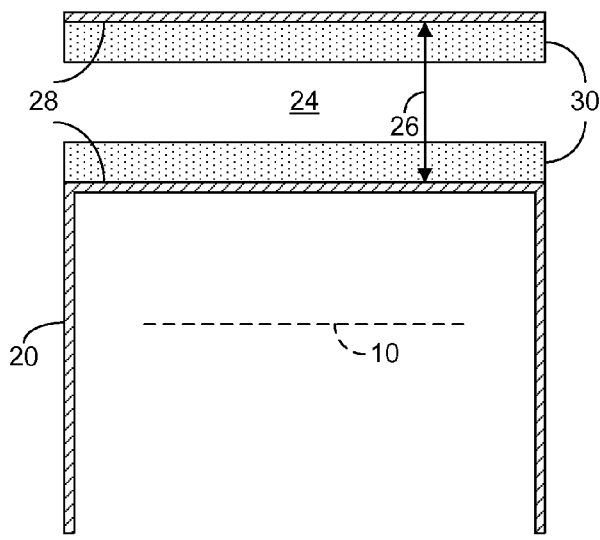
FIG. 4 is a cut-away side view of the partition and channel shown in FIG. 3.

Referring to FIGS. 3 and 4 in combination with FIGS. 1 and 2, a partition 20 extends along a lateral axis 22 within the plenum 8 between the upstream region 12 of the plenum 8 and the downstream region 18 of the plenum 8. A channel 24 penetrates through the partition 20 along the longitudinal axis 10 that has a gap 26 across its inner surface 28 that approximates on wavelength of at least one fundamental frequency of high frequency noise that the gas turbine engine 16 generates. Acoustic damping material 30 lines the inner surface 28 of the channel. The thickness of the acoustic material ideally approximates one-quarter wavelength of at least one fundamental frequency of the high frequency noise. In this embodiment, an inner surface 32 of the plenum, which may also be an inner surface 34 of the fuselage, forms a portion of the inner surface 28 of the channel 24.

The inlet silencer 2 may also divert airflow from the air inlet 4 around an inlet air deflection shield 36. The inlet air deflection shield 36 is a partition that extends along the lateral axis 22 within the upstream region 12 of the plenum 8 that blocks direct flow of air between the air inlet 4 and the channel 24. The inlet air deflection shield 36 prevents any moisture, ice or foreign objects from passing directly from the air inlet 4 through the channel 24 and into the air intake 14 for the gas turbine engine 16, thus preventing foreign object damage to the gas turbine engine 16.

Figure 5:
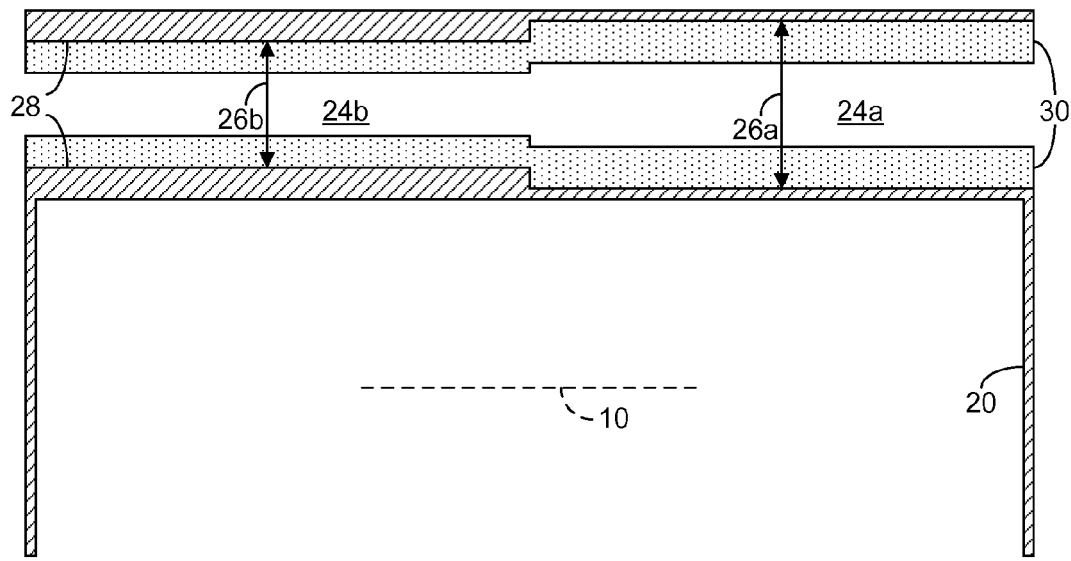
FIG. 5 is a cut-away side view of a partition and channel for a second possible embodiment of the inlet silencer.

The inlet silencer 2 may attenuate high frequency noise that changes in frequency or contains multiple fundamental frequencies. FIG. 5 is a cut-away side view of the partition 20 and channel 24 for a second possible embodiment of the inlet silencer 2. In this embodiment, the inner surface 28 of the channel 24 is staircase-shaped. As a result, a first portion of the channel 24, represented by 24a, has a spacing of the gap 26, represented by 26a, that approximates a first wavelength of a fundamental frequency of the high frequency noise that the gas turbine engine 16 generates. A second portion of the channel 24, represented by 24b, has a spacing of the gap 26, represented by 26b, that approximates a second wavelength of a fundamental frequency of the high frequency noise that the gas turbine engine 16 generates. Ideally, the acoustic damping material 30 within the first portion 24a of the channel 24 has a thickness of approximately one-quarter of the first wavelength of high frequency noise and the acoustic damping material 30 within the second portion 24b of the channel 24 has a thickness of approximately one-quarter of the second wavelength of high frequency noise.

The inner surface 28 of the channel 24 may have additional steps to give the channel 24 additional portions with different spacings of the gap 26 that each approximate a different one of additional different fundamental frequencies of the high frequency noise. Similarly, the thickness of the acoustic damping material 30 within each additional portion of the channel 24 may ideally have a thickness of approximately one-quarter of the wavelength of high frequency noise represented in length by its corresponding spacing of the gap 26.

Figure 6:
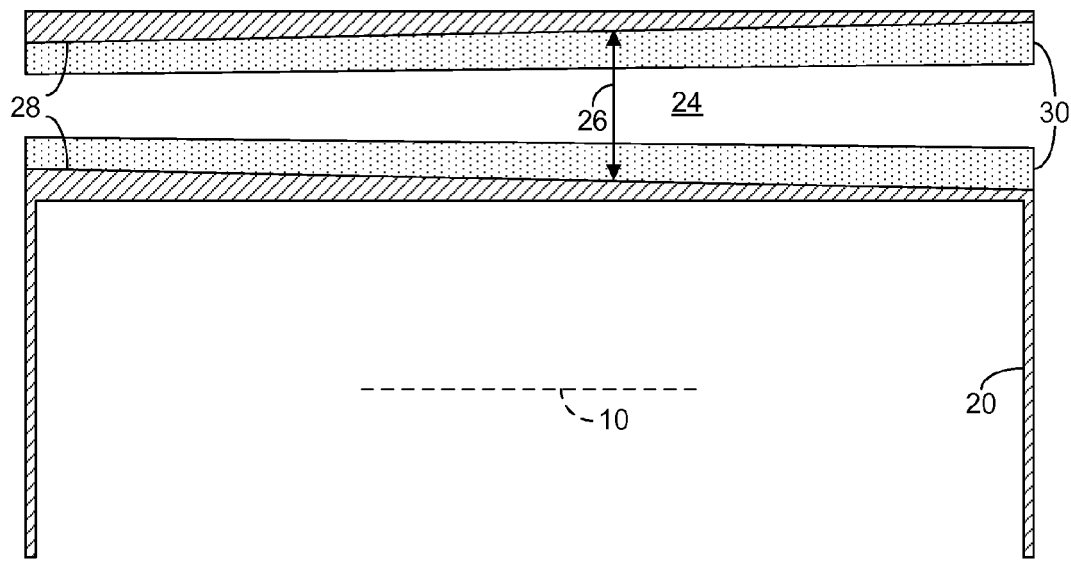
FIG. 6 is a cut-away side view of a partition and channel for a third possible embodiment of the inlet silencer.

FIG. 6 is a cut-away side view of the partition 20 and channel 24 for a third possible embodiment of the inlet silencer 2. In this embodiment, the inner surface 28 of the channel 24 is ramp-shaped. As a result, the gap 26 changes in spacing along the length of the channel 24 to approximate a wavelength of a range or multiple of fundamental frequencies of the high frequency noise that the gas turbine engine 16 generates. Ideally, the acoustic damping material 30 within the channel 24 changes in thickness along the length of the channel 24 to approximate one-quarter wavelength of a fundamental frequency of the high frequency noise, the wavelength of which is represented by the spacing of the gap 26 at any point in the channel 24.

Figure 7:
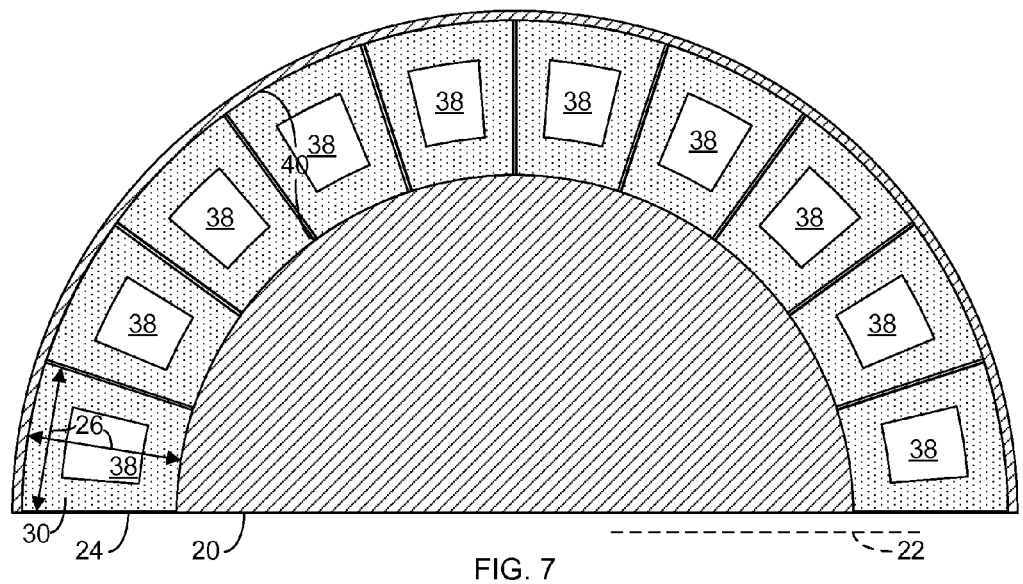
FIG. 7 is an end view of a partition and channel for a fourth possible embodiment of the inlet silencer.

FIG. 7 is an end view of the partition 20 and channel 24 for a fourth possible embodiment of the inlet silencer 2. In this embodiment, the channel 24 comprises multiple segments 38 along the longitudinal axis 10. Each of the segments 38 have the gap 26 across its inner surface 40 of approximately one wavelength of at least one fundamental frequency of the high frequency noise that the gas turbine generator 16 generates. The acoustic damping material 30 lines the inner surface 40 of each segment 38. Ideally, the acoustic damping material 30 within each segment 38 has a thickness that approximates one-quarter wavelength of the gap 26. Since each of the segments 38 have the gap 26 in at least two orthogonal directions, noise attenuation may be more effective. Although FIG. 7 shows the segments 38 as generally rectilinear, they may alternately be curvilinear, such as of a circular shape. Likewise, the segments 38 may have staircase-shaped or ramp-shaped inner surfaces 40 so that their respective gaps 26 correspond in spacing to multiple fundamental wavelengths of high frequency noise generated by the gas turbine engine 16.

Figure 8:
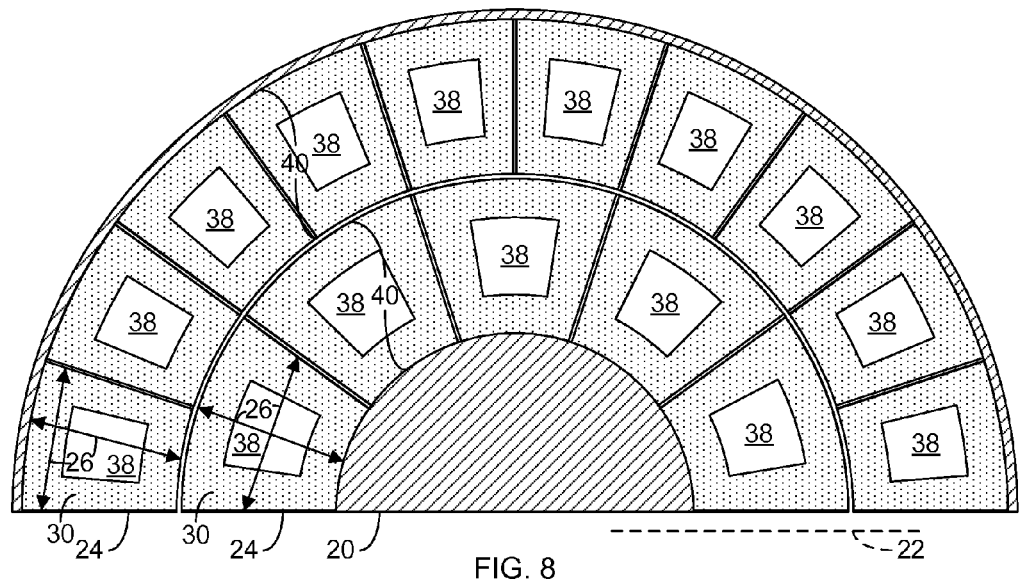
FIG. 8 is an end view of a partition and multiple channels for a fifth possible embodiment of the inlet silencer.

FIG. 8 is an end view of the partition 20 and multiple channels 24 for a fifth possible embodiment of the inlet silencer 2. It is similar to the fourth embodiment of the invention as shown in FIG. 7, but it has an additional channel 24 with segments 38 to secure improved airflow. Although FIG. 8 shows two of the channels 24 with segments 38, alternatively the inlet silencer 2 may have additional channels 24 with segments 38 or two or more channels 24 without segments 38 to improve airflow still further.

The embodiments as described herein are in reference to an aeronautical vehicle with a gas turbine engine wherein such engines have significant compressor intake noise of high frequency. However, the embodiments are equally suitable to other applications, such as silencing of the intake of a stationary miniturbine power unit or the intake of a supercharged diesel power unit, both of which may have objectionable high frequency compressor intake noise. The described embodiments as set forth herein represents only some illustrative implementations of the invention as set forth in the attached claims. Changes and substitutions of various details and arrangement thereof are within the scope of the claimed invention.

The invention claimed is:

1. An inlet silencer for an air inlet in a housing, which housing contains a source of high frequency noise radiated by an air intake for the source of high frequency noise, comprising:
   a plenum that extends longitudinally within the housing that couples the air inlet in an upstream region of the plenum to the air intake for the source of high frequency noise in a downstream region of the plenum;
   a partition that extends laterally within the plenum between the upstream region of the plenum and the downstream region of the plenum;
   at least one channel that penetrates longitudinally through the partition that has a gap across its inner surface that approximates one wavelength of at least one fundamental frequency of high frequency noise that the source of high frequency noise generates; and
   acoustic damping material that lines the inner surface of the channel.

2. The inlet silencer of claim 1, wherein the acoustic damping material has a thickness that approximates one-quarter wavelength of at least one fundamental frequency of the high frequency noise.

3. The inlet silencer of claim 1, wherein an inner surface of the plenum forms a portion of the inner surface of the at least one channel.

4. The inlet silencer of claim 3, wherein an inner surface of the housing forms a portion of the inner surface of the at least one channel.

5. The inlet silencer of claim 1, wherein the gap across the inner surface of the at least one channel has multiple spacings along the length of the at least one channel that each approximate one wavelength for a corresponding one of multiple fundamental frequencies of the high frequency noise.

6. The inlet silencer of claim 5, wherein the inner surface of the channel is staircase-shaped to achieve the multiple spacings of the gap.

7. The inlet silencer of claim 5, wherein the inner surface of the at least one channel is ramp-shaped to achieve the multiple spacings of the gap.

8. The inlet silencer of claim 1, wherein the at least one channel comprises multiple longitudinal segments, each of which have a gap across its inner surface of approximately one wavelength of at least one fundamental frequency of the high frequency noise and the acoustic damping material lines the inner surface of each segment in the at least one channel.

9. The inlet silencer of claim 8, wherein the acoustic damping material has a thickness that approximates one-quarter wavelength of at least one fundamental frequency of the high frequency noise.

10. The inlet silencer of claim 1, further comprising multiple channels that penetrate longitudinally through the partition that each have a gap across its inner surface that approximates one wavelength of at least one fundamental frequency of the high frequency noise and acoustic damping material that lines the inner surface of each channel.

11. The inlet silencer of claim 10, wherein the gap across the inner surface of each channel has multiple spacings along the length of each channel that each approximate one wavelength for a corresponding one of multiple fundamental frequencies of the high frequency noise.

12. The inlet silencer of claim 11, wherein the inner surface of each channel is staircase-shaped to achieve the multiple spacings of the gap.

13. The inlet silencer of claim 11, wherein the inner surface of each channel is ramp-shaped to achieve the multiple spacings of the gap.

14. The inlet silencer of claim 10, wherein each channel comprises multiple longitudinal segments, each of which have a gap across its inner surface of approximately one wavelength of at least one fundamental frequency of the high frequency noise and the acoustic damping material lines the inner surface of each segment in the channel.

15. The inlet silencer of claim 14, wherein the acoustic damping material has a thickness that approximates one-quarter wavelength of at least one fundamental frequency of the high frequency noise.

16. The inlet silencer of claim 1, further comprising an inlet air deflection shield in the form of a partition that extends laterally within the upstream region of the plenum that blocks direct flow of air between the air inlet and the at least one channel.

17. An inlet silencer for an air inlet in a fuselage of an aeronautical vehicle, which fuselage contains a gas turbine engine that radiates high frequency noise by way of an air intake for the gas turbine engine, comprising:
   a plenum that extends longitudinally within the fuselage that couples the air inlet in an upstream region of the plenum to the air intake for the gas turbine engine in a downstream region of the plenum;
   a partition that extends laterally within the plenum between the upstream region of the plenum and the downstream region of the plenum;
   at least one channel that penetrates longitudinally through the partition that has a gap across its inner surface that approximates one wavelength of at least one fundamental frequency of high frequency noise that the gas turbine engine generates; and
   acoustic damping material that lines the inner surface of the channel with a thickness that approximates one-quarter wavelength of at least one fundamental frequency of the high frequency noise.

18. The inlet silencer of claim 17, wherein an inner surface of the plenum forms a portion of the inner surface of the at least one channel.

19. The inlet silencer of claim 18, wherein an inner surface of the fuselage forms a portion of the inner surface of the at least one channel.

20. The inlet silencer of claim 17, wherein the gap across the inner surface of the at least one channel has multiple spacings along the length of the channel that each approximate one wavelength for a corresponding one of multiple fundamental frequencies of the high frequency noise.

21. The inlet silencer of claim 20, wherein the inner surface of the at least one channel is staircase-shaped to achieve the multiple spacings of the gap.

22. The inlet silencer of claim 20, wherein the inner surface of the at least one channel is ramp-shaped to achieve the multiple spacings of the gap.

23. The inlet silencer of claim 17, further comprising an inlet air deflection shield in the form of a partition that extends laterally within the upstream region of the plenum that blocks direct flow of air between the air inlet and the at least one channel.

* * * * *